(12) United States Patent
Lord

(10) Patent No.: US 7,054,660 B2
(45) Date of Patent: May 30, 2006

(54) MULTIMEDIA BROADCASTING, BROADCAST SERVICES FOR CELL PHONE AND OTHER USERS AND MODIFIED SIM CARD AND RELATED MEANS FOR ENABLING SUCH BROADCAST RECEPTION

(75) Inventor: Frank H. Lord, Beaconsfield (GB)

(73) Assignee: Paperless Interactive Newspaper, LLC, Hartford, CT (US)

( * ) Notice: Subject to any disclaimer, the term of this patent is extended or adjusted under 35 U.S.C. 154(b) by 0 days.

(21) Appl. No.: 10/481,497

(22) PCT Filed: Jun. 24, 2002

(86) PCT No.: PCT/US02/19837

§ 371 (c)(1),
(2), (4) Date: Jun. 2, 2004

(87) PCT Pub. No.: WO03/001772

PCT Pub. Date: Jan. 3, 2003

(65) Prior Publication Data

US 2004/0209649 A1    Oct. 21, 2004

Related U.S. Application Data

(63) Continuation-in-part of application No. 09/848,099, filed on May 3, 2001.

(60) Provisional application No. 60/201,793, filed on May 4, 2000.

(30) Foreign Application Priority Data

Jun. 22, 2001  (GB) ................................ 0115346.9
Oct. 26, 2001  (GB) ................................ 0125776.5

(51) Int. Cl.
*H04Q 7/20* (2006.01)

(52) U.S. Cl. ...................... 455/558; 455/418; 455/3.02
(58) Field of Classification Search ................ 455/558, 455/418, 419, 3.02
See application file for complete search history.

(56) References Cited

U.S. PATENT DOCUMENTS

| | | |
|---|---|---|
| 4,613,990 A | 9/1986 | Halpern |
| 4,646,290 A | 2/1987 | Hills |
| 4,740,912 A | 4/1988 | Whitaker |
| 5,128,662 A | 7/1992 | Failla |
| 5,315,638 A | 5/1994 | Makari |
| 5,418,837 A | 5/1995 | Johansson et al. |
| 5,506,902 A | 4/1996 | Kubota |
| 5,557,320 A | 9/1996 | Krebs |
| 5,630,103 A | 5/1997 | Smith et al. |
| 5,694,455 A * | 12/1997 | Goodman .................... 455/413 |

(Continued)

FOREIGN PATENT DOCUMENTS

GB        2 286751      8/1995

(Continued)

*Primary Examiner*—Erika A. Gary
(74) *Attorney, Agent, or Firm*—Kirkpatrick & Lockhart Nicholson Graham LLP

(57) ABSTRACT

Preferred embodiments enable cell phone users to plug in a novel SIM card and receive a multimedia broadcast of their choice, television, celebrity broadcast calls, newspapers, games, video and the like, without initializing with a service provider. Adapters can provide additional cell phone communication channels enabling a user to talk on the phone while receiving a broadcast into storage or to quickly receive a broadcast over multiple channels. Cell phone TV flicker can be inhibited by receiving over multiple channels. Each channel can be controlled or activated by its own SIM card. Novel product-specific SIM cards are provided to enable reception of specific broadcasts.

48 Claims, 2 Drawing Sheets

U.S. PATENT DOCUMENTS

| | | | |
|---|---|---|---|
| 5,913,165 A | 6/1999 | Foti | |
| 6,011,976 A * | 1/2000 | Michaels et al. | 455/466 |
| 6,021,433 A | 2/2000 | Payne et al. | |
| 6,041,359 A | 3/2000 | Birdwell | |
| 6,044,062 A | 3/2000 | Brownrigg et al. | |
| 6,052,145 A | 4/2000 | Macrae et al. | |
| 6,052,591 A * | 4/2000 | Bhatia | 455/445 |
| 6,052,715 A | 4/2000 | Fukui et al. | |
| 6,108,703 A | 8/2000 | Leighton et al. | |
| 6,119,020 A | 9/2000 | Miller et al. | |
| 6,195,531 B1 | 2/2001 | Aguirre et al. | |
| 6,195,568 B1 | 2/2001 | Irvin | |
| 6,216,173 B1 | 4/2001 | Jones et al. | |
| 6,799,155 B1 * | 9/2004 | Lindemann et al. | 703/24 |
| 6,904,567 B1 * | 6/2005 | Hermann et al. | 715/756 |
| 2002/0124252 A1 * | 9/2002 | Schaefer et al. | 725/33 |
| 2002/0146125 A1 * | 10/2002 | Eskicioglu et al. | 380/255 |
| 2004/0038676 A1 * | 2/2004 | Hochscherff et al. | 455/422.1 |

FOREIGN PATENT DOCUMENTS

| | | |
|---|---|---|
| JP | 6 3131674 | 6/1988 |
| JP | 6 164759 | 6/1994 |
| JP | 8 167958 | 6/1996 |
| JP | 1 132019 | 2/1999 |
| JP | 1 1313191 | 11/1999 |
| WO | WO 98/57318 | 12/1998 |
| WO | WO 99/38266 | 7/1999 |

* cited by examiner

MULTIMEDIA BROADCASTING, BROADCAST SERVICES FOR CELL PHONE AND OTHER USERS AND MODIFIED SIM CARD AND RELATED MEANS FOR ENABLING SUCH BROADCAST RECEPTION

CROSS-REFERENCE TO RELATED APPLICATIONS

With respect to the designation of the United States, this application is a continuation-in-part of copending U.S. patent application Ser. No. 09/848,099 filed May 3, 2001 and entitled "BROADCAST MULTIMEDIA DELIVERY SYSTEM", the entire disclosure of which is hereby incorporated herein by reference thereto.

The present invention relates to improvements in, modifications of and supplements to the invention described in International PCT Patent Application No. PCT/US01/14404 filed: 04 May 2001 by Paperless Interactive Newspaper LLC, claiming priority of U.S. provisional patent application No. 60/201,793 filed 04 May 2000, which international application was published under No. WO 01/84339 on 08 Nov. 2001, referenced "our prior international application" hereinafter. The entire disclosure of the aforesaid published application No. WO 01/84339 is hereby incorporated herein by reference thereto.

BACKGROUND OF THE INVENTION

Thus, the present invention relates to the electronic distribution of large data files such as television programs, newspapers, computer games, other multimedia communications, text files and so on, to receiver-equipped audiences, and in particular to audiences located in approximately identifiable geographic areas. The invention also relates to the electronic distribution of files and content to mobile users especially when they are away from their home or office.

The following description of background art may include insights, discoveries, understandings or disclosures, or associations together of disclosures, that were not known to the relevant art prior to the present invention but which were provided by the invention. Some such contributions of the invention may be specifically pointed out below, whereas other such contributions of the invention will be apparent from their context.

The use of electronic communication is increasing dramatically. Many homes in the United States have perhaps tens of devices capable of receiving or displaying electronic communications or audibilizing such communications. Such homes may have multiple television receivers, multiple computers connected or connectable with the Internet, as well as multiple telephone units, radio telephone units and multiple radios. Nevertheless, there is constant need to develop improved means for communicating information such as news, entertainment and personal items to audiences. There is a particular need to provide better means of communicating such content of interest to mobile users who may be traveling or located away from their home or office where their primary receiving equipment is located.

Various proposal have been made for distribution of multimedia data via the Internet. For example, Leighton et al. U.S. Pat. No. 6,108,703 ("Leighton") discloses a system of management of content delivery on the Internet using multiple servers to provide a fault tolerant infrastructure (column 2, lines 26–31).

Also, Krebs U.S. Pat. No. 5,557,320 ("Krebs") discloses a video distribution system intended to solve congestion problems in transmitting video across heterogenous networks comprising telephone, wireless, satellite, etc. (column 1, lines 5–7) by employing a managing network provider. The managing network provider schedules each video request and sets up control points to each receiver that operate on a per transmission basis (claim 1). However these systems are dependent upon the user having access to the Internet for which most people require the inconvenience of land lines. There presently exists no efficient method for wireless access to the Internet which is suitable for distribution of large files, such as multimedia, to a large number of users.

BRIEF SUMMARY OF THE INVENTION

The present invention solves the problem of distributing large data files such as television programs, newspapers, computer games, other multimedia communications, text files and so on to an audience in a more advantageous and in most cases a more convenient manner than has heretofore been possible. The invention furthermore solves the problem of distributing such files and content to mobile users especially when they are away from their home or office.

Our prior international application, which was not available to the public on Jun. 22, 2001 when UK application number 0115346.9 from which the present application claims priority discloses an invention which for the first time utilized cellular phone systems for mass distribution of bulk digitized information content, especially multimedia content such as newspapers, television, music, Internet content and so on, by broadcasting the information simultaneously to multiple cell phone users, each of whom receives the content simultaneously with other users. The invention of our prior international applicatin provided a teaching of as to how the benefits of the information world could be conveniently made available to mobile users and others.

To solve the foregoing and other problems, the present invention provides, in one aspect a computerized radiotelephone receiver capable of telephone communication on a cellular radiotelephone system and having the ability to receive a broadcast communication from the radiotelephone system without initializing with the radiotelephone system wherein the radiotelephone comprises a removable electronic accessory device encoded with a machine-readable electronic key, optionally a telephone number, enabling reception of the broadcast communication. In preferred embodiments, the radiotelephone receiver comprises a cell phone and the electronic accessory device comprises a subscriber identification module or "SIM" card.

An extra line for receiving the broadcasts can be provided by use of a twin or multi-line SIM card where the lines for receiving the broadcast do not need to initialize wit the service provider.

By encoding or otherwise storing an electronic key and any other information required to access a cellular broadcast on a SIM card or other removable accessory device, the present invention provides a new, convenient way to enable cell phone users and others to obtain the benefits of broadcast reception without having to buy new equipment or modify their existing equipment. Many cell phone users already have SIM card units especially for GSM ("Global System for Mobile Communications") service, a worldwide advanced digital wireless technology. They can receive the benefits of cellular radio frequency broadcasts provided pursuant to the present invention simply by inserting a SIM card encoded with a phone number or other key The radio telephone receiver can also be a cellular-wireless-enabled computer, for example a foldable or laptop computer or a desktop computer equipped with the ability to receive cellular telephony broadcasts, for example by being provided with a cell phone docking port into which the user can insert their cell phone.

One preferred embodiment of the invention provides multiple broadcast access numbers on a single SIM card enabling multiple broadcasts, or channels to be received simultaneously. For example one channel can be received and store while another is viewed. Alternatively, a single television transmission or other "bulky" content can be transmitted and received over two or more channels to increase the overall data rate and thereby avoid or reduce flicker.

In another aspect, the invention provides a removable electronic accessory device encoded with a machine-readable electronic key, optionally a telephone number, enabling reception of the broadcast communication for a computerized radiotelephone receiver capable of telephone communication on a cellular radiotelephone system and having the ability to receive a broadcast communication from the radiotelephone system. Preferably, the radiotelephone receiver comprises a cell phone and the electronic accessory device comprises a SIM card.

The SIM card can be of the type which is received into a slot in the back of the cell phone, or elsewhere, and which has a laminar configuration with a beveled corner to orient the card in the cell phone.

Also, the SIM card can enable conventional SIM card-compatible cell phones to receive broadcasts via at least one broadcast-specific phone number and be retrofittable to provide broadcast reception capability to SIM card-compatible cell phones that lack broadcast reception capability.

In anther aspect, the invention provides a method of broadcasting a communication, optionally a program or a channel providing continuous content, the method comprising transmitting the communication from cellular radiotelephone system to a population of users of computerized radiotelephone receivers having the ability to receive the broadcast communication from the radiotelephone system without initializing with the radiotelephone system wherein each radiotelephone comprises a removable electronic accessory device encoded with a machine-readable electronic key, optionally a telephone number, enabling reception of the broadcast communication, the method further comprising distributing the electronic key to the users prior to broadcasting the communication.

One or more broadcasts can be made from a terrestrial or satellite transmitter, and, if desired via a cellular network of transmitters to be simultaneously received by any suitably equipped devices within signal range. Optionally, multiple channels can be broadcast simultaneously to individual receivers within range of a transmitting transceiver.

Preferably, the broadcast is made to and received by users who have previously received an electronic key to authorize reception of a particular broadcast or broadcast channel or channels.

BRIEF DESCRIPTION OF THE SEVERAL VIEWS OF THE DRAWING

Some embodiments of the invention, and of making and using the invention, as well as the best mode contemplated of carrying out the invention, if not described above, are described in detail below, by way of example, with reference to the accompanying drawings, in which like reference characters designate the same or similar elements throughout the several views, and in which.

DETAILED DESCRIPTION OF THE INVENTION

Figure 1:
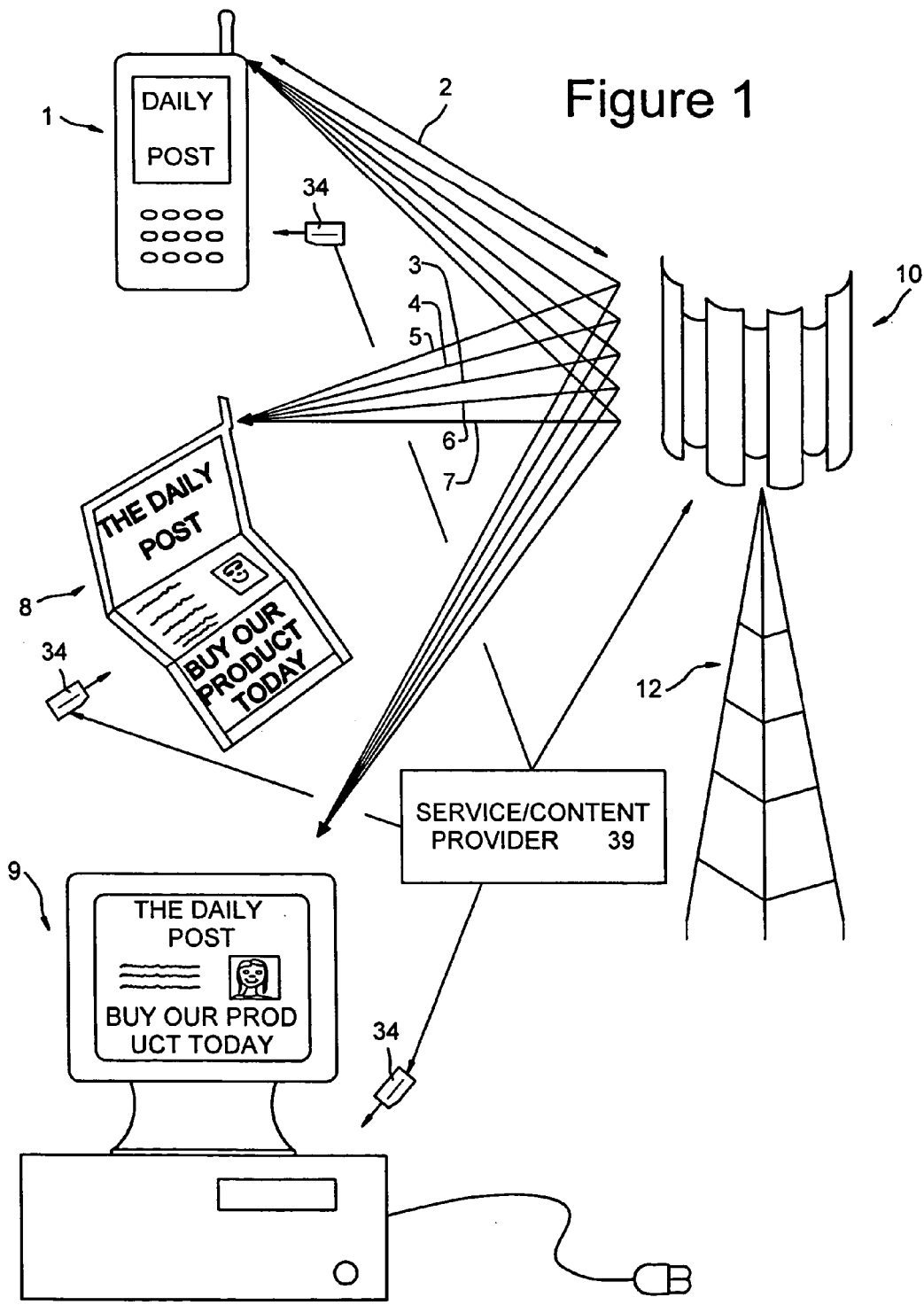
FIG. 1 is a schematic view of a cellular phone broadcast system for broadcasting multimedia and other content to be received by a number of wireless-enabled multimedia player devices, according to a preferred embodiment of the invention.
Figure 2:
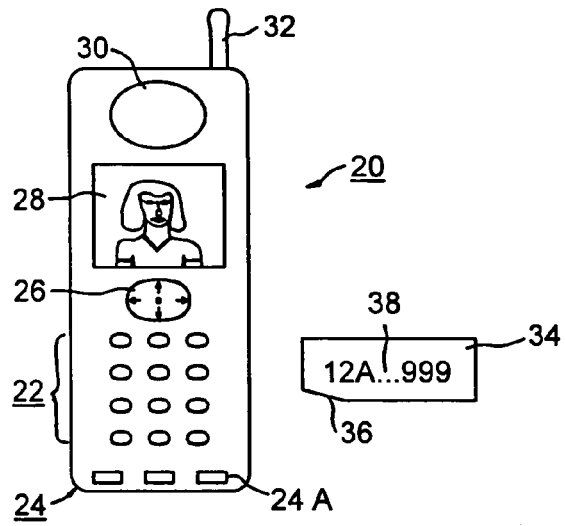
FIG. 2 is a front elevational view of a cell phone useful in the practice of the broadcast system illustrated in FIG. 1.
Figure 3:
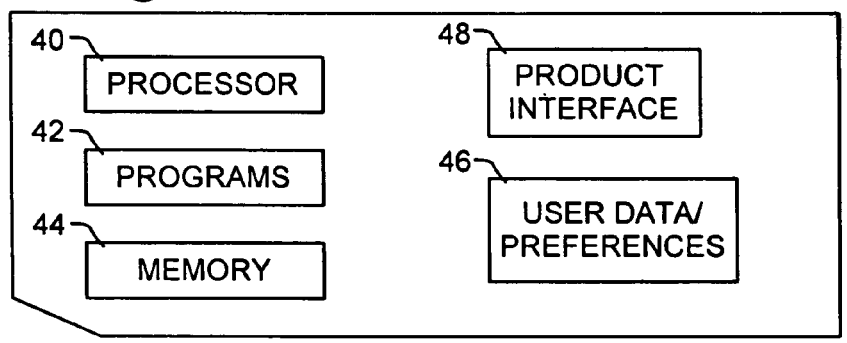
FIG. 3 is a schematic view, to a larger scale, of a SIM card useful in the cell phone shown in FIG. 2 to enable reception of broadcast transmissions, pursuant to the invention.

Referring to FIGS. 1–3, the broadcast system illustrated comprises a number of suitable receiving devices, such as a computerized or computer-enabled mobile or cell phone 1 in two-way communication with a service provider employing a cellular transmitter-receiver 10 transceiving from a mast 12. Multiple information channels such as are referenced 3–7, some or all of which may include multi-media content, are broadcast to a community of users who may be equipped with a variety of different hardware receivers for one or more of channels 3–7.

In addition to cell phones 1, preferred embodiments of which are described in more detail hereinbelow suitable hardware receivers may include other computerized radiotelephone receiver for example cellular-wireless-enabled computers, such as foldable or laptop computer 8 and desktop computer 9. Each computer 8 or 9 comprises a radio frequency receiver tunable to an appropriate broadcast frequency and adapted to receive one or more broadcasts according to the technical and business requirements of the service provider. For example, the receiving devices may be provided with a software, or more preferably a firmware product interface capable of recognizing and enabling reception of the broadcast without initializing and preferably without requiring handshaking. Receiving devices 1, 8, 9 are preferably computing-enabled devices having a memory and control software, provided pursuant to he invention, to control the memory and the reception of broadcasts. The control software can store or alternatively not store an incoming broadcast according to choices made by the computer user, e.g. from a menu of incoming multi media data.

The broadcasts from a given terrestrial or satellite transmitter 10 can be simultaneously received by any suitably equipped devices 1, 8 or 9 within signal range which range will be determined, as is known in the field of cellular telephony, for example, by geography, local topography, weather and other environmental conditions as well as device sensitivity.

As illustrated, in addition to broadcasting a given channel 3, 4, 5, 6 or 7 to the receiving community of users, multiple channels may be broadcast at the same time to individual receivers within range of transceiver 10.

Preferably, the broadcast is made to and received by users who have previously received suitable means to authorize reception of a particular broadcast or broadcast channel or channels. The enabling means is preferably supplied by the service provider, or possibly by a content provider, or an agent of either and may comprise an electronic personal broadcast key which is unique to an individual and enables reception of a specific broadcast channel or channels or content of a specific channel for a defined period of time, e.g. the duration of a show or an event, for example from 30 minutes to 6 hours. The personal broadcast key can be stored in machine-readable form on an electronic accessory device that is readable by and mechanically cooperative with the computerized radiotelephone receiver to be received therein or otherwise attached thereto.

More preferred, however, is a personal broadcast key which enables the reception of at least one specified channel for a defined period of time, for example one three or six months, one, two or three years, or a trial period of one week. The personal broadcast key can comprise a private code and the specific broadcast to be enabled can comprise a public code, and the private and public codes can be used cooperatively by the receiving device to unlock the receiving device to process the specific broadcast for viewing, listening and/or storage by the viewer. Preferably, the personal broadcast key also includes a personal, code which can include a personal identifier or an identifier indicating the source, distributional or otherwise of the personal broadcast key. The personal broadcast key may optionally additionally include coding keys which enable decoding of an encrypted broadcast. Preferably, if the personal broadcast key does not meet the service provider's requirements as defined in the specific broadcast signal public key; no viewing, hearing or storage of the specific broadcast is possible.

The private, public and personal codes may take any suitable desired form such as numeric, alphanumeric, ASCII, graphic, iconic or other machine-readable codes, or combinations of the foregoing.

Optionally, one or more specific broadcasts may be locked, encrypted or otherwise rendered inaccessible, and the personal broadcast key is operative to unlock the broadcast or to enable the radiotelephone receiver operating cooperatively with the electronic accessory device, to unlock the broadcast.

The personal broadcast key may be supplied to the user in any suitable manner, including in a suitably managed software download. from a remote source or server. However, it is preferred that the personal broadcast key be encoded in firmware or otherwise stored on a machine-readable hardware device such as a cellular phone accessory card, stick or the like, preferably in read-only mode. Particularly preferred is that the personal broadcast key be encoded in a modified subscriber identification module embodied in a card or chip (a "SIM card" hereinafter), such as SIM card 34, or an equivalent thereof.

SIM cards and their use are described in for example U.S. Pat. Nos. 5,418,837; 6,119,020; 6,195,531 and 6,195,568 the entire disclosures of which patents are hereby incorporated herein by reference thereto. Such SIM cards can be utilized in the present invention when modified to achieve the purposes of the invention, as is described herein or as will be apparent to those skilled in the art from this description.

Referring more particularly to FIGS. 2 and 3, a portable radiotelephone 20 suitable for use with a cellular transmission system, ubiquitously available and known as a "cell phone" and so called hereinafter, comprises four rows of numeric and function keys 22, an additional row of function keys 24 and directional selection or cursor keys 26. A preferred cell phone 20 can process digital signals, is computer enabled and has a high quality video display 28 capable of playing television, movie clips or movies and other action video. A volume-controllable speaker 30 provides sound and cell phone 20 transceives via an antenna 32.

A modified SIM card 34 is received into a slot in the back of cell phone 20 which cooperates with a built-in card reader (not shown). The card reader reads data and programming, if present, from SIM card 34 for utilization by cell phone 20's systems. SIM card 34 has a business card-like laminar configuration with a beveled or chamfered corner 36 which orients the card with its host device, in this case cell phone 20. Alternatively, SIM card 34 can be configured as a chip set on a removable card, or a stick or whatever other configuration of insertable member has been devised for modifying or supplementing the functionality of cell phone 20. An external device communicating via USB, serial or other communications protocol, infrared, or even radio frequency via the cell phone's antenna could be employed, possibly in conjunction with an external reader. However, such an external SIM card 34 or equivalent device, would lack convenience.

In one preferred embodiment, SIN card 34 has sufficient functionality to enable conventional SIM card-compatible cell phones to receive broadcasts via at least one broadcast-specific phone number. If desired, SIM card 34 can enable or prompt a download of software to facilitate broadcast reception. Thus, such a SIM card 34 is retrofittable to provide broadcast reception capability to SIM card-compatible cell phones that lack it. Such SIN cards of course work cooperatively with a service or content provider that provides the broadcast on a cellular radiotelephone system.

An optically readable code 38, of any suitable length, may be carried on an outer surface of SIM card 34 to identify the particular card and may for example comprise a serial number segmented into groups of characters, each group signifying a different matter, e.g. card serial number, broadcast product enabled, duration, card issuer and so on. Code 38 may comprise bar coding with an alphanumeric transliteration may be imprinted, embossed or otherwise displayed on an outer surface of SIM card 34, if desired.

As illustrated in FIG. 1, SIM cards 34 can be distributed by a service or content provider 39 to users of devices such as cell phone 1, radio-receiving enabled computers 8 or 9, who wish to receive one or more broadcasts, as determined by the SIM card data,. Distribution may be through any desired retail, wholesale, mail order or Internet channels and need not be limited to the traditional electronics equipment outlets that usually supply cell phones and computers. Outlets such as newsstands, general stores and free promotional direct mailings may be employed. Preferably, service or content provider 39, or their agent codes the respective broadcast transmitted from transmitter 10 to be accessible by an electronic key embodied in the particular SIM cards distributed intended to be read by devices 1, 8 and 9. Thus, particular SIM cards 34 may be associated with a particular broadcast or broadcast service and may be distinctively marked, packaged and/or promoted for that purpose.

Multiple types of SIM cards 34 can be made available and a user can then choose the kind of service they would like to receive by choosing the appropriate SIM card 34. Having made a selection, the user puts the SIM card in their cell phone 20. Cell phone 20 is then enabled to receive the chosen broadcast sent out by the service provider.

The broadcasts can be simple text messages of known type to send to cell phones, the difference being that the messages are broadcast to a receiving community instead of being transmitted individually. The content of the broadcasts can also be a one-sided phone call, for example; an entertainer or news reader can broadcast to many cell phones simultaneously, chatting to cell phone 20 user, informing them entertaining them and also advertizing to them.

The data that is broadcast can be more sophisticated if cell phone 20 has the ability to receive and store and display broadcasted multimedia data.

For example, cell phones 20 having substantial data storage capability can be operated with a SIM card that enables reception of sophisticated broadcast services comprising video, sound, music, newspapers, and/or computer games, stories or any other product or item that can be transmitted in digital form.

Reception of broadcasts, preferably, does not require an initializing exchange with the service provider. The requirement to receive the transmission is preferably presence within the geographical area that is covered by the broadcast, i.e. presence of the receiving device within range of the transmission. The broadcast can be made from many transmitters either simultaneously or possibly staggered to avoid interference at adjacent fringes. Every receiver-enabled device, within the geographic transmission area can receive and record the broadcast onto its memory. The user then has the broadcasted data on their computing device or cell phone memory.

Referring now to FIG. 3, modified SIM card 34 can comprise a processor 40, one or more programs 42 and suitable memory 44 and will usually also contain at least minimal user data 46. Pursuant to the invention, modified SIM card 34 includes a product interface 48 which may be as simple as a phone number that provides access to one or more specific broadcasts enabled by SIM card 34, preferably without initialization or receipt of a dial tone. Multiple such broadcast access numbers may be provided on a single SIM card 34, if desired. Such an access code number may constitute, or be an element of, the personal broadcast key described above. If desired, SIM card 34 may include some or all of the features of the personal broadcast key described above.

In one preferred embodiment, a function key, for example, function key 24A can be utilized to access the specific broadcast, or more preferably, where SIM card 34 authorizes extended use of a specific channel or channels function key 24A is automatically programmed to provide one-button access and display of the specific channel or channels. Such one-button access may optionally be dependent upon configuring cell phone 20 to be in a specific mode, e.g. a multimedia play mode, using other controls.

User data 46 may include user identification and account status and billing information, if desired. The account status can be read by cell phone 20 which may make the specific broadcast or other or all broadcasts available to the user only if the account status is "OK" to permit the broadcast. Alternatively, SIM card 34 may require the user to provide demographic or other information before enabling broadcast reception. Such information may be forwarded to a service provider or other remote location by cell phone 20, before broadcast reception is enabled. Alternatively, and more desirably for user friendliness, the demographic or other information is saved to a file stored on cell phone 20 and forwarded to a suitable processing center, or the service provider, at a later time, in a manner which is preferably transparent to the user.

User data 46 can also include user preferences for configuration of cell phone 20, for broadcast reception and for any other desired purpose, if desired.

Preferably, SIM card 34 is tunable to permit the user to select a desired broadcast from two or more broadcasts, for example up to six, twelve or twenty or more broadcasts enabled by SIM card 34, by manipulation of cell phone 20's controls. Alternatively, necessary tuning can be provided by cell phone 20 or SIM card 34 can be pretuned to a single frequency.

Employing a tunable SIM card 20, cell phone 20 can receive data, for example a selection menu of available programming and/or channels or events, from a source such as the Internet or a cell phone transmission or any other suitable source means, the user can use the data to select the broadcast of their choice.

As suggested above SIM card 34 may have more than one telephone number. One number can be the user's personal cell phone number for receiving cell phone calls and the second and subsequent numbers or codes can be used for receiving multimedia broadcasts. The multimedia broadcast-receiving numbers do not have to initialize with the service provider. The broadcast or broadcasts can be received by any or all enabled users within the geographical area. A broadcast phone number or recognition code can be associated with a specific broadcast or broadcast channel so that all users within the transmission range employ the same phone number or recognition code to receive the broadcast. The broadcast can be transmitted to multiple users within the area of the transmission simultaneously, enabling the users to all receive the digital multimedia broadcast information transmitted by the cell phone service provider at the same time.

Compound numbers can be provided having a parent portion specific to a given product, for example a newspaper, and a child portion specific to a subdivision of the parent product for example the sports section of the newspaper.

To cover a large area, country, state or region with a particular broadcast program or channel the service provider can transmit the service from a multiplicity of transmitters, in cells, to cover the desired area. Where such cells employ different frequencies, it is preferred that each number accesses multiple geographically contiguous cells across a country, state or region, continent, etc. However, other configurations will be apparent to those skilled in the art.

Optional memory 44 if present on SIM card 34 can be employed to store, or assist store the multimedia broadcast. Alternatively, the broadcasted multimedia data can be stored on memory associated with cell phone 20, or memory associated with a receiver-enabled computer.

A multi-channel SIM card 34 can be used to enable receiving of more than one broadcast at a time. The broadcaster can send out a service that is designed to be simultaneously received on multiple channels, and viewed as a single broadcast. This embodiment of the invention is particularly, but not exclusively useful for the transmission of large data files such as video and television. Such files can be stored in SIM card memory 44 or in memory on cell phone 20, under the control of suitable software. If desired, the broadcast can be viewed as it arrives in real time, simultaneously with other users receiving the same broadcast. In this way, cell phone users, can watch television or video on their cell phone without having to dial into the service provider. Employing the invention, the user can watch TV on their cell phone by switching on their cell phone, in a similar way to switching on a domestic TV. An improved television image, with reduction or avoidance of flicker, may be obtained by receiving the television broadcast over multiple cellular broadcast channels.

Reception of a multi channel broadcast is effected by SIM card 20 having the ability to recognize incoming channels as being of interest to the computer or cell phone user. Accepting the transmitted broadcast thus enabling the computer or cell phones software to direct the incoming broadcasted multimedia data to the storage file of the computer or cell phone user's choice.

In another embodiment of the invention SIM card 20 is provided with the ability to receive more than one transmission and accept broadcasts and displays and to store or display and store the multimedia data, received on more than one channel giving the receiving device the ability to receive very fast transmissions of broadcasted multimedia data. Such broadcast transmissions can be made at higher than normal agreed data rates by tailoring the broadcasts to be accepted only by devices enabled by SIM card 20 by users that have chosen to accept the service by inserting the broadcast-accepting SIM card into the users hardware.

With a conventional cell phone, to make a call, the user turns the unit on and sends an "off-hook" signal to the cellular system provider. The cellular system has to receive the off-hook signal and then return a dial tone to the subscriber or other user. When the dial tone is received the user then keys in, or enters a phone number from storage. The phone number is transmitted to the cellular system using an appropriate frequency, for which the cell phone was previously set up or for which it searches. The cellular system must receive the phone number and respond before the user is able to send or receive communications. Pursuant to the present invention the reception of broadcasts is greatly eased and such initialization procedures are avoided.

To this end, in a preferred embodiment SIM card 34 or other suitable means provides a phone number, or equivalent, and preferably also provides frequency identification or frequency selection codes to the cell phone 20. To receive the broadcast enabled by SIM card 20, the user merely powers up the unit, and selects the broadcast channel, for example by "dialing", or speed-dialing the number associated with the broadcast, as provided by the SIM card. Of course the number may be transparent to the user and forwarded electronically by the cell phone unit, in response to the user's selection of a suitable menu entry or label associated with the broadcast. The frequency identification or selection coding furnished with the SIM card enables cell phone 20 to tune into the appropriate frequency, frequencies or wave band when the particular broadcast is selected or dialed by the user, whereupon cell phone 20 can immediately begin to receive and process whatever communication is being transmitted on that frequency. If necessary, cell phone 20 can effect decoding or decryption or otherwise respond to control codes received in the broadcast or coded into a subcarrier for the broadcast to process the broadcast in accordance with the user's preferences. In an alternative mode, a particular broadcast may be coded or programmed to ring the user's phone and trigger the phone to automatically commence receiving the broadcast transmission.

No response to, or individual handling of the user's "call", by the cellular system is required, although such may be employed, if desired, e.g for registration or account setup or the like. A user can tune in or tune out the broadcast as though it were a conventional broadcast, without such actions being known to the cellular system.

The transmitted broadcast signal can be addressed to a single telephone number or other code which is potentially receivable by a community of tens, hundreds or thousands of users. Alternatively it could be unaddressed and simply sent on a preassigned frequency. The broadcast transmission can contain control codes or information regarding the forthcoming broadcast to configure the receiving unit the better to receive the broadcast or to operate the receiving device to provide fulfil the user's pre-specified preferences.

Figure 4:
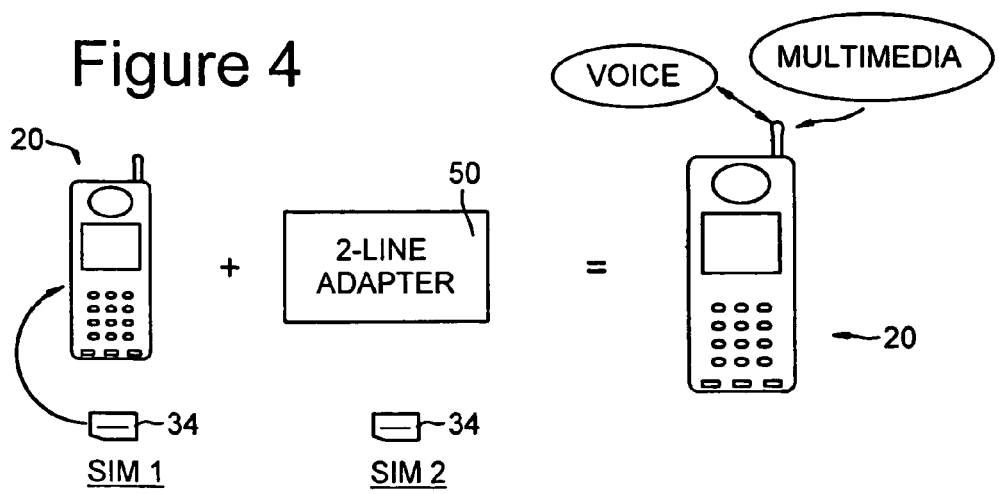
FIG. 4 is a schematic view illustrating the components of a cell phone apparatus useful in the practice of the broadcast system illustrated in FIG. 1.

Referring now to FIG. 4, a cell phone 20 controlled or activated by a first SIM card 34, SIM 1, can be adapted to enable a user to conveniently gain the benefits of the present invention by adding to cell phone 20 a multi-line adapter such as 2-line adapter 50 which adds one or more "lines" to cell phone 20. By using a SIM card converter a cell phone user is enabled to receive incoming multimedia broadcasts or other messages on a second or waveband or on additional wavebands. Preferably, adapter 50 also requires a SIM card 34, SIM2, for activation. With adapter 50 and both SIM cards installed, a user of cell phone 20 can receive a broadcast on one or more lines provided by adapter 50 while a conducting a voice conversation on the cell phone's original line. The broadcast can either be stored or played visually. Optionally, audio switching may be provided in cell phone 20 or adapter 50 to enable the user to select which transmission to hear when cell phone 20 is receiving multiple transmissions. As described above, if adapter 50 provides multiple additional lines, e.g. from two to four lines, these additional lines can cooperatively receive a broadcast at optimal data rates, unconstrained by voice call requirements.

SIM card 20 can recognize second or additional transmissions as being for the cell phone 20 or computer user. By fitting cell phone 20 with a multi-channel SIM card enables the phone to effectively have two or more telephone numbers that will make the phone ring connecting the cell phone 20 to the base station via two or more lines.

Adapter 50 gives cell phone 20 an extra phone line, or lines, that can be used to receive text, sound messages and/or multimedia data broadcast service. Preferably, pursuant to the invention, this capability is provided with a communications protocol for the additional line or lines that does not require the additional line or lines to initialize with the service provider. Optionally, suitable numbers for the additional line or lines can be furnished by he service provider. The same cell phone number or numbers can be used by each of the population of receiving cell phones and receiver-enabled computers, wishing to receive the newly available multimedia broadcasts of information/entertainment. The service provider can then broadcast the message to all cell phones that have the same number simultaneously, that are within the range of the transmitter.

SIM cards 20 and SIM card converters or adapters 50 can be distributed by newspaper, magazine, Internet or cell phone companies or any other organizations as a free promotional gift or for purchase.

The broadcasts can be, and preferably are, provided with advertising content to pay for the service so that the service is free of charge. Alternatively, the service can be paid by subscription, monthly billing, or any other suitable method. The broadcast service can be tailored to different groups such as demographic groups, user-interest groups, clubs and the like, with the additional phone number or numbers corresponding with a particular selected or designed service according to the user choice and profile.

One example of a multichannel multimedia broadcast for immediate use, i.e. for live utilization as it is received, is a broadcasted phone call for example from a celebrity to their fans, a fan club or other group. The call can be a musician introducing a piece of music and then playing a sample of the music with an advertising message promoting purchase of a CD, album or the like. The phone call can ring at a pre-notified time or during a time interval so that the user answers the call and has the experience of conducting a phone call directly with the celebrity. The call can be accompanied by a video of the musician playing on cell phone 20's display screen 28. If desired, the data can also be recorded to memory if requested by the user.

A more personalized service can be provided by embedding a message or other communication in a broadcast and targeting the message to be received only by a specific user, by suitably encoding the message. For example the message may be preceded by a header recognizable by the targeted user but not recognized by other recipients of the broadcast When a message is recognized, the targeted user's cell phone 20 can download the message or messages, and optionally sound, post or display an alert to the user "You have mail" or the like. In this way an email service can be operated distributing specifically addressed emails to a community of users as embedded passengers in a broadcast, preferably a 24 hour broadcast, to a user population, which can be accessed or addressed via a single broadcast-related or "generic" phone number. Each user's cell phone 20 need merely monitor the broadcast for relevant messages targeted or addressed to a given user to which the individual cell phone unit responds. In this way, the cell phone user's email, voicemail, music service or other personal communication, can be downloaded and ready to review at any time, without the user having to dial in to obtain the messages.

For example, a reader's letter can be E-mailed, or a text message, can be sent to the broadcaster/service provider, and then the E-mail or information contained in it can be broadcast within the next and subsequent broadcasts.

Software provided pursuant to the invention for managing reception of broadcasts can store, sort and search incoming broadcasts for user-specified subject matter of interest, for example by key words or groups of words, and perform other routines and procedures to achieve the functionality described herein. The software can recognize incoming broadcasts and then command the computer or cell phone 20 to store the broadcast to memory if the user has requested the data to be stored. The software can search the stored data for items of special interest by words or groups of words or by any other method of recognition and then store the chosen data to another memory file. Data for immediate use can also be stored by the device if desired by the user. The enabling software for these and other functions can be downloaded from the Internet, a CD or any other method.

While the above-described broadcast receiving and processing functionality provided by the invention has been described with particular reference to a cell phone, it will be understood, particularly in light of the disclosure of our prior international application, that the invention is also applicable to comparable receiver-enabled computers employing a radiotelephone module, optionally a cell phone, to receive broadcasts. The radiotelephone module can employ a modified SIM card, pursuant to the invention and it will be understood that substantial data-processing capability, such as file storage and playback as well as online display and audio, can be shifted to the computer which can be a desktop or laptop or other such device. Alternatively, an internal, or external wireless receiver card may be employed.

The broadcast can also be viewed using a cell phone receiver module that is built into or plugged onto a television receiver to enable the cellular broadcasts to be played on the television receiver. The cell phone receiver can output to the antenna (or aerial) input of the television receiver and have pass through connections permitting a conventional terrestrial, satellite or cable TV signal to be used. The cell phone receiver module can be tuneable or use a tuneable SIM card or a multinumber SIM card as described herein. The cell phone receiver module can be remote controlled, in the manner of a VCR, using a remote control that enables the user to tune the module to receive the viewer's choice of program, including broadcast programming that the module receives from a cell phone service provider. This embodiment enables a user to switch from viewing a cell-phone television broadcast on a small cell phone video display to a much larger standard television monitor. The television receiver is enabled to receive the cell phone broadcast.

Preferred embodiments of the present invention may incorporate any or all of the features, services and options disclosed in our prior international application, in so far as these capabilities are appropriate for a telephony broadcast-enabled receiving device as described herein.

INDUSTRIAL APPLICABILITY

The present invention is particularly suitable for application in the entertainment and communications industries providing new methods and electronic devices for transmission and playing of multimedia and other content.

While illustrative embodiments of the invention have been described above, it is, of course, understood that various modifications will be apparent to those of ordinary skill in the relevant art, or may become apparent as the art develops. Many such modifications are contemplated as being within the spirit and scope of the invention.

The invention claimed is:

1. A computerized cell phone capable of telephone communication on a cellular phone system, the cellular phone system having a transmitter-receiver providing broadcast transmissions of large data files, each broadcast transmission being simultaneously receivable by multiple enabled cell phone users in range of the transmitter receiver, the cell phone comprising a removable electronic accessory device provided with a machine-readable electronic key and having the ability to receive the broadcast transmission from the cellular phone system, wherein the cell phone is capable of receiving large data files and wherein the electronic key enables reception of the broadcast transmission without initialization with the cellular phone system.

2. A computerized cell phone according to claim 1 wherein the cell phone has sufficient memory for storage of large data files and wherein the electronic accessory device comprises a SIM card.

3. A computerized cell phone according to claim 2 having a slot to accommodate the SIM card wherein the SIM card is received into the slot in the cell phone and has a laminar configuration with a beveled corner to orient the card in the cell phone.

4. A computerized cell phone according to claim 2 wherein the SIM card can enable SIM card-compatible cell phones to receive broadcasts via at least one broadcast-specific phone number and is retrofittable to provide broadcast reception capability to SIM card-compatible cell phones that lack broadcast reception capability.

5. A computerized cell phone according to claim 4 wherein the SIM card comprises user identification data and user preferences for configuration of the cell phone for broadcast reception.

6. A computerized cell phone according to claim 2 wherein the SIM card comprises a processor one or more programs and random-access memory user data and a product interface, optionally a phone number to provide access to one or more specific broadcasts enabled by the SIM card.

7. A computerized cell phone according to claim 2 wherein multiple such broadcast access numbers are provided on a single SIM card.

8. A computerized cell phone according to claim 1 wherein the cell phone comprises a foldable screen.

9. A computerized cell phone according to claim 8 wherein the foldable screen comprises a multimedia viewing screen, wherein the screen is divided into two or more foldable sections the foldable sections being viewable as one screen when opened.

10. A computerized cell phone according to claim 1 wherein the receiving devices comprise a software or firmware product interface capable of recognizing and enabling reception of the broadcast without initializing.

11. A computerized cell phone according to claim 1 wherein the computerized cell phone comprises user-controllable writable memory and control software to control the memory and the reception of broadcasts and in that the control software can store or not store an incoming broadcast according to choices made by the cell phone user.

12. A computerized cell phone according to claim 1 wherein the electronic accessory device is readable by and mechanically cooperative with the computerized cell phone and is receivable in or attachable to the computerized cell phone.

13. A computerized cell phone according to claim 1 wherein the electronic key comprises a personal broadcast key which enables the reception of at least one specified channel for a defined period of time.

14. A computerized cell phone according to claim 13 wherein the personal broadcast key comprises a private code and the specific broadcast to be enabled comprises a public code, the private and public codes being cooperative to unlock the receiving device to process the specific broadcast for viewing, listening and/or storage by the viewer.

15. A computerized cell phone according to claim 1 wherein a function key is programmed to provide one-button access and display of a specific channel or channels.

16. A computerized cell phone according to claim 1 wherein the SIM card is tunable to permit the user to select a desired broadcast from two or more broadcasts.

17. A computerized cell phone according to claim 1 wherein the SIM card has multiple telephone numbers or recognition codes and wherein one of the multiple numbers is the user's personal cell phone number for receiving cell phone calls and at least a second number or codes is used for receiving multimedia broadcasts.

18. A computerized cell phone according to claim 1 wherein the cell phone comprises a multi-line adapter to add one or more lines to the cell phone.

19. A computerized cell phone according to claim 1 comprising an extensible screen to facilitate the reading of large data files and/or newspapers, television, films or multimedia data.

20. A computerized cell phone according to claim 1 comprising a cell phone receiver module that is built into or plugged onto a television receiver to enable the received cellular broadcasts to be played on the television receiver wherein optionally the cell phone receiver can output to the antenna input of the television receiver and has pass-through connections permitting a conventional terrestrial, satellite or cable TV signal to be used.

21. Control software for a computerized cell phone as claimed in claim 1 comprising procedures to control storage and reception of received broadcast data files permitting the user to store or alternatively not store, to play or display, and optionally to edit, an incoming broadcast according to choices made by the computer user optionally from an incoming broadcast menu of available multimedia data.

22. A computerized cell phone according to claim 1 wherein the machine-readable electronic key is a telephone number.

23. A cellular phone system comprising a transmitter-receiver providing broadcast transmissions of large data files and multiple computerized cell phones according to claim 1 to receive the broadcasts.

24. A cellular phone system according to claim 23 wherein one or more of the cell phones communicates with a computer, the computer providing one or more of data-processing capability, file storage, playback, display and/or audio.

25. A cellular phone system according to claim 24 wherein one or more of the cell phones comprises cell phone functionality embodied in an internal, or external wireless receiver card installed in a computer, optionally a desktop or laptop computer.

26. A removable electronic accessory device for a computerized radiotelephone receiver capable of telephone communication on a cellular radiotelephone system and of receiving cellular phone broadcast transmissions, the accessory device being encoded with a machine-readable electronic key, optionally a telephone number, wherein the electronic accessory device comprises a SIM card, the SIM card can enable a SIM card-compatible cell phone to receive broadcasts via at least one broadcast-specific phone number and is retrofittable to provide broadcast reception capability to a SIM card-compatible cell phone lacking broadcast reception capability and wherein the electronic key enables reception of broadcast transmission of large data files by the radiotelephone system without initialization.

27. An accessory device according to claim 26 wherein the radiotelephone receiver comprises a cell phone.

28. An accessory device according to claim 27 wherein the SIM card is received into a slot in the back of the cell phone and has a laminar configuration with a beveled corner to orient the card in the cell phone.

29. An accessory device according to claim 27 wherein the SIM card provides storage for large data files and carries multiple broadcast access numbers.

30. An accessory device according to claim 27 wherein the SIM card comprises a processor, one or more programs, random-access memory, user data, a product interface and a phone number to provide access to one or more specific broadcasts enabled by the SIM card.

31. An accessory device according to claim 27 wherein multiple such broadcast access numbers are provided on a single SIM card.

32. A method of broadcasting, the method comprising:
a) employing a terrestrial or satellite cell phone transmitter to transmit large data files from a cellular phone system to a population of cell-phone-equipped users wherein each said user cell phone has:
  i) a removable electronic accessory device provided with a machine-readable electronic key enabling reception of the broadcast communication; and
  ii) the ability to receive the broadcast communication from the cellular phone system without initializing with the cell phone system;
b) distributing the electronic key to the users prior to broadcasting the large data files and by one or more broadcasts from an individual said terrestrial or satellite transmitter being simultaneously receivable by any one of the cell-phone equipped users within signal range.

33. A method according to claim 32 wherein multiple channels are broadcast simultaneously to individual receivers within range of the transmitter.

34. A method according to claim 32 comprising the broadcast being made to and received by users who have previously received an electronic key to authorize reception of a particular broadcast or broadcast channel or channels.

35. A method according to claim 32 comprising the electronic key being supplied by a service or content provider and wherein each receiving cell phone comprises an electronic personal broadcast key which is unique to an individual user and enables reception of a specific broadcast channel or channels or content of a specific channel for a defined period of time, the defined period of time optionally being the duration of a show or an event.

36. A method according to claim 32 comprising a service or content provider distributing SIM cards to cell phone users through retail, wholesale, mail order or Internet channels.

37. A method according to claim 36 comprising the service or content provider coding a respective broadcast transmission to be accessible by the electronic key embodied in the SIM cards distributed so that particular SIM cards are associated with a particular broadcast or broadcast service and optionally are distinctively marked, packaged and/or promoted for that purpose.

38. A method according to claim 32 comprising multiple types of SIM cards being available for multiple services and comprising a user being able to choose the service by choosing an appropriate SIM card.

39. A method according to claim 38 comprising the user inserting the chosen SIM card in their cell phone selecting one of multiple available broadcast-specific phone numbers and receiving the chosen broadcast sent out by the service provider.

40. A method according to claim 32 wherein the broadcast comprises a text message, a celebrity phone call, multimedia content, television, video, sound, music, newspapers, computer games, or one or more stories or combinations of any two or more of said broadcasts.

41. A method according to claim 32 comprising users receiving broadcasts without requiring an initializing exchange with the service provider.

42. A method according to claim 32 comprising employing a tunable SIM card to enable the cell phone to receive data regarding available programming and/or channels or events wherein the user can use the data to select the broadcast of their choice.

43. A method according to claim 32 comprising the cell phone users connecting with the multimedia broadcast-receiving numbers without having to initialize with the service provider, the broadcast or broadcasts being receivable by enabled users within the transmission range, a broadcast phone number or recognition code being associated with a specific broadcast or broadcast channel so that all users within the transmission range can employ the same phone number or recognition code to receive the broadcast and transmitting the broadcast to multiple users within the transmission range simultaneously, enabling the users to all receive the digital multimedia broadcast information transmitted by the cell phone service provider at the same time.

44. A method according to claim 32 comprising employing a multi-channel SIM card to enable receiving of multiple broadcasts simultaneously.

45. A method according to claim 32 comprising embedding a personalized message or other communication in a broadcast and targeting the message to be received only by a specific user, optionally by encoding the message in the broadcast.

46. A receiver-enabled computer comprising a cell phone capable of telephone communication on a cellular phone system, the cellular phone system having a transmitter-receiver providing broadcast transmissions of large data files, each broadcast transmission being simultaneously receivable by multiple enabled cell phone users in range of the transmitter receiver, the cell phone having the ability to receive broadcast transmissions from the cellular phone system and communicate the received transmissions to the computer and comprising a removable electronic accessory device provided with a machine-readable electronic key and, wherein the cell phone is capable of receiving large data files and wherein the electronic key enables reception of the broadcast transmission without initialization with the cellular phone system.

47. A receiver-enabled computer according to claim 46 wherein the computer provides one or more of data-processing capability, file storage, playback, display and/or audio.

48. A receiver-enabled computer according to claim 46 wherein one or more of the cell phones comprises cell phone functionality embodied in an internal, or external wireless receiver card installed in a computer, the computer optionally being a desktop or laptop computer.

* * * * *